(12) United States Patent
Hao et al.

(10) Patent No.: US 12,273,493 B2
(45) Date of Patent: Apr. 8, 2025

(54) METHOD AND DEVICE FOR IMAGE STORAGE CONTROL, AND STORAGE MEDIUM

(71) Applicant: ZTE Corporation, Shenzhen (CN)

(72) Inventors: Zhijian Hao, Shenzhen (CN); Qiwu Zhang, Shenzhen (CN); Jiansheng Yuan, Shenzhen (CN); Jinxian Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 514 days.

(21) Appl. No.: 17/292,283

(22) PCT Filed: Nov. 1, 2019

(86) PCT No.: PCT/CN2019/115040
§ 371 (c)(1),
(2) Date: May 7, 2021

(87) PCT Pub. No.: WO2020/093944
PCT Pub. Date: May 14, 2020

(65) Prior Publication Data
US 2021/0400165 A1 Dec. 23, 2021

(30) Foreign Application Priority Data
Nov. 7, 2018 (CN) .......................... 201811320813.3

(51) Int. Cl.
*H04N 1/21* (2006.01)
*G06F 21/32* (2013.01)

(52) U.S. Cl.
CPC .......... *H04N 1/2129* (2013.01); *G06F 21/32* (2013.01); *H04N 1/2187* (2013.01); *H04N 2201/218* (2013.01)

(58) Field of Classification Search
CPC .............. H04N 1/2129; H04N 1/2187; H04N 2201/218; H04N 21/42201;
(Continued)

(56) References Cited

U.S. PATENT DOCUMENTS

2010/0185750 A1* 7/2010 Nakayama ......... H04N 1/00464
709/219
2010/0279738 A1 11/2010 Kim et al.
(Continued)

FOREIGN PATENT DOCUMENTS

| CN | 105262878 A | 1/2016 |
| CN | 105550555 A | 5/2016 |

(Continued)

OTHER PUBLICATIONS

European Patent Office. European Office Action for EP Application No. 19882843.6, mailed Jan. 24, 2023, pp. 1-6.
(Continued)

*Primary Examiner* — Chan S Park
*Assistant Examiner* — Daniel C Chang
(74) *Attorney, Agent, or Firm* — Vivacqua Crane, PLLC

(57) ABSTRACT

A method and device for image storage control, and a storage medium are disclosed. The method may include: collecting biometric information of a user during capturing an image; and performing storage and clearing processing on image data obtained by capturing according to storage control information corresponding to the biometric information.

9 Claims, 5 Drawing Sheets

(58) Field of Classification Search
CPC ........... H04N 21/4223; H04N 21/4335; H04N 23/611; H04N 1/00127; H04N 1/00172; H04N 1/2112; H04N 1/2166; H04N 1/00307; H04N 1/32101; H04N 5/76; H04N 5/772; H04N 23/64; H04N 23/80; G06F 21/32; Y02D 10/00
See application file for complete search history.

(56) References Cited

U.S. PATENT DOCUMENTS

| | | | |
|---|---|---|---|
| 2015/0146026 A1* | 5/2015 | Walker | G11B 27/34 348/211.2 |
| 2016/0189008 A1* | 6/2016 | Zhang | G06V 30/413 382/224 |
| 2016/0210517 A1 | 7/2016 | Luo et al. | |
| 2018/0139347 A1* | 5/2018 | Janakiraman | G06F 3/0605 |
| 2020/0059703 A1* | 2/2020 | Sonare | H04N 21/23418 |

FOREIGN PATENT DOCUMENTS

| | | | | |
|---|---|---|---|---|
| CN | 106096511 A | | 11/2016 | |
| CN | 107784089 A | | 3/2018 | |
| CN | 107918529 A | | 4/2018 | |
| CN | 108170800 A | | 6/2018 | |
| CN | 109543570 | * | 3/2019 | ......... G06K 9/00046 |
| EP | 3161720 A1 | | 5/2017 | |
| EP | 3457298 A1 | * | 3/2019 | |
| JP | 2005338951 A | * | 12/2005 | |
| JP | 2007312226 A | * | 11/2007 | |
| KR | 20170061891 A | * | 6/2017 | |
| WO | 2017206454 A1 | | 12/2017 | |

OTHER PUBLICATIONS

International Search Report and Written Opinion for the International Patent Application No. PCT/CN2019/115040 dated Jan. 14, 2020.
European Patent Office. Extended European Search Report for EP Application No. 19882843.6, mailed Nov. 9, 2021, pp. 1-9.
The State Intellectual Property Office of People's Republic of China. First Office Action for CN Application No. 201811320813.3 and English translation, mailed Nov. 25, 2021, pp. 1-16.
The State Intellectual Property Office of People's Republic of China. Search Report for CN Application No. 201811320813.3 and English translation, mailed Nov. 21, 2021, pp. 1-4.
European Patent Office. Communication pursuant to Article 94(3) for EP Application No. 19882843.6, mailed Jun. 26, 2024, pp. 1-6.

* cited by examiner

METHOD AND DEVICE FOR IMAGE STORAGE CONTROL, AND STORAGE MEDIUM

CROSS-REFERENCE TO RELATED APPLICATION

The present disclosure is a national stage filing under 35 U.S.C. § 371 of international application number PCT/CN2019/115040, filed on 1 Nov. 2019, which claims the priority of the Chinese patent application No. 201811320813.3, entitled "a method and device for image storage control, and a storage medium", and filed on 17 Nov. 2018. The contents of these applications are incorporated herein by reference in their entirety.

TECHNICAL FIELD

The present disclosure relates to the field of communication technology, and in particular, to a method and device for image storage control, and a storage medium.

BACKGROUND

With the development of science and technology, mobile terminals have become an indispensable part of people's lives. A large amount of data, such as photos, videos, game data, application data, various files, etc., are stored in mobile terminals, which makes the storage space of mobile terminals smaller and smaller with the increase of use time.

At present, after capturing, photos or videos are stored in a folder, for example, in an album folder. With the increase of capturing time and capturing quantity, the number of photos and videos in the album will accumulate, occupying more and more storage space. Although the storage space of existing mobile terminals is getting larger and larger, blindly pursuing large storage space cannot fundamentally solve the problem, because the storage space is limited and will be filled up eventually. The existing ways to clear the storage space is that after the mobile terminal prompts that the storage space is full, a user actively views photos or videos one by one in the photo album and deletes all or part of the photos or videos, which is time-consuming and laborious, and the user experience effect is poor.

SUMMARY

According to the present disclosure, a method for image storage control is provided, including: collecting biometric information of a user during capturing image data; and performing storage and clearing processing on the image data obtained by capturing according to storage control information corresponding to the biometric information.

According to the present disclosure, a device for image storage control is further provided, including a processor and a memory. The memory stores an image storage control program which, when executed by the processor, causes the processor to perform the method for image storage control described above.

According to the present disclosure, a storage medium storing one or more programs is further provided. The storing one or more programs, when executed by one or more processors, cause the one or more processors to perform the method for image storage control described above.

DETAILED DESCRIPTION

The present disclosure will be described in detail below in combination with the drawings and the embodiments. It should be understood that the embodiments described herein are used to explain the present disclosure, and do not limit the present disclosure.

Embodiment One

According to the present disclosure, a method for image storage control is provided. The execution subject of this embodiment is a mobile terminal. The mobile terminal may be a smart phone, a tablet computer, etc.

Figure 1:
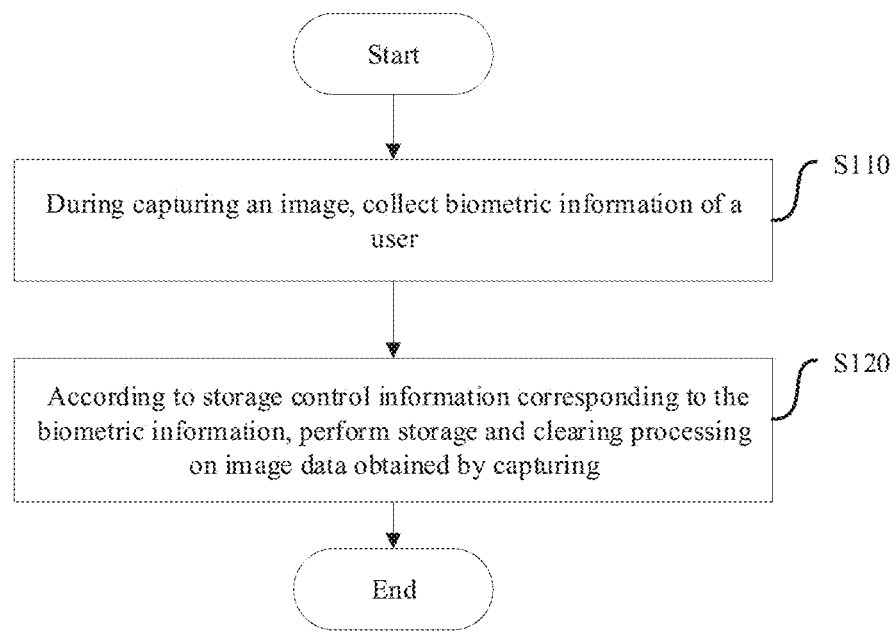
FIG. 1 is a flowchart of a method for image storage control according to embodiment one of the present disclosure.

FIG. 1 is a flowchart of a method for image storage control according to embodiment one of the present disclosure, where the method includes following steps S110 and S120.

In a step of S110, biometric information of a user is collected during capturing an image.

Capturing an image includes: capturing a photo or a video. After an image is captured, image data is obtained. The image data is photo data or video data.

The biometric information includes, but is not limited to, a fingerprint feature. In this embodiment, the biometric information may be fingerprint features of different fingers.

In an embodiment, the mobile terminal has an internal or external biometric collector. In an implementation, the mobile terminal may be a terminal with an under-screen fingerprint collector, a terminal with full-screen fingerprint recognition, or a terminal with an independent fingerprint collector.

In this embodiment, during capturing an image, the biometric information of the user may be collected by invoking the internal or external biometric collector of the mobile terminal. The user is a user who captures an image using the mobile terminal.

Figure 2:
FIG. 2 is a schematic diagram of fingerprint recognition according to embodiment one of the present disclosure.

In an implementation, the biometric collector is arranged on a shutter key, and the biometric collector is invoked to collect the biometric information of the user while the user presses the shutter key. FIG. 2 is a schematic diagram of fingerprint recognition according to embodiment one of the present disclosure. As shown in FIG. 2, the mobile terminal has an internal fingerprint collector, which is configured to collect fingerprint features on the whole or partial screen, and may at least collect fingerprint features on a shadow area (shutter key) in FIG. 2. When a capturing interface is in the foreground of the mobile terminal, the fingerprint collector is activated, and the fingerprint collector is invoked to collect the fingerprint features of the user on the shutter key while the user presses the shutter key.

In a step of S120, storage and clearing processing is performed on image data captured according to storage control information corresponding to the biometric information.

The storage control information includes storage time limit control information and/or storage path control information.

The storage time limit control information includes storage time limit, and storage and clearing strategy based on the storage time limit.

The storage path control information includes storage path, and storage and clearing strategy based on the storage path.

The storage time limit may be 7 days, 14 days, 30 days, etc. The storage and clearing strategy based on the storage time limit may be setting a storage time limit for the image data and storing the image data, and deleting the image data in response to an expiration of the storage time limit of the image data.

The storage path may be a family image data path, a landscape image data path, a work image data path, etc. The storage and clearing strategy based on the storage path may be storing the image data according to the storage path, and deleting the image data after storing for a preset time period, or deleting the image data under the storage path by the user.

In an embodiment, storage control information is correspondingly set for each biometric information in advance; the storage control information corresponding to the collected biometric information is searched for after image data is obtained by capturing. In an implementation, a first storage control information is correspondingly set for the fingerprint feature information of the right thumb, a first storage control information is correspondingly set for the fingerprint feature information of the right index finger.

After image data is obtained by capturing, the storage time limit and/or the storage path corresponding to the collected biometric information are acquired, and storage and clearing processing is correspondingly performed on the image data obtained by capturing according to the storage and clearing strategy based on the storage time limit and/or the storage and clearing strategy based on the storage path, so as to release the storage space of the mobile terminal.

In this embodiment, different storage control information is set for different biometric information in advance. The biometric information of the user is collected while capturing an image. Storage and clearing processing is performed on the image data obtained by capturing according to the storage control information corresponding to the collected biometric information, so as to release the storage space of the mobile terminal. Therefore, the mobile terminal can continuously store the image data newly captured by the user even with the increase of capturing time and capturing quantity.

The steps of performing storage and clearing processing in the disclosure will be further explained through Embodiments two to four below.

Embodiment Two

Figure 3:
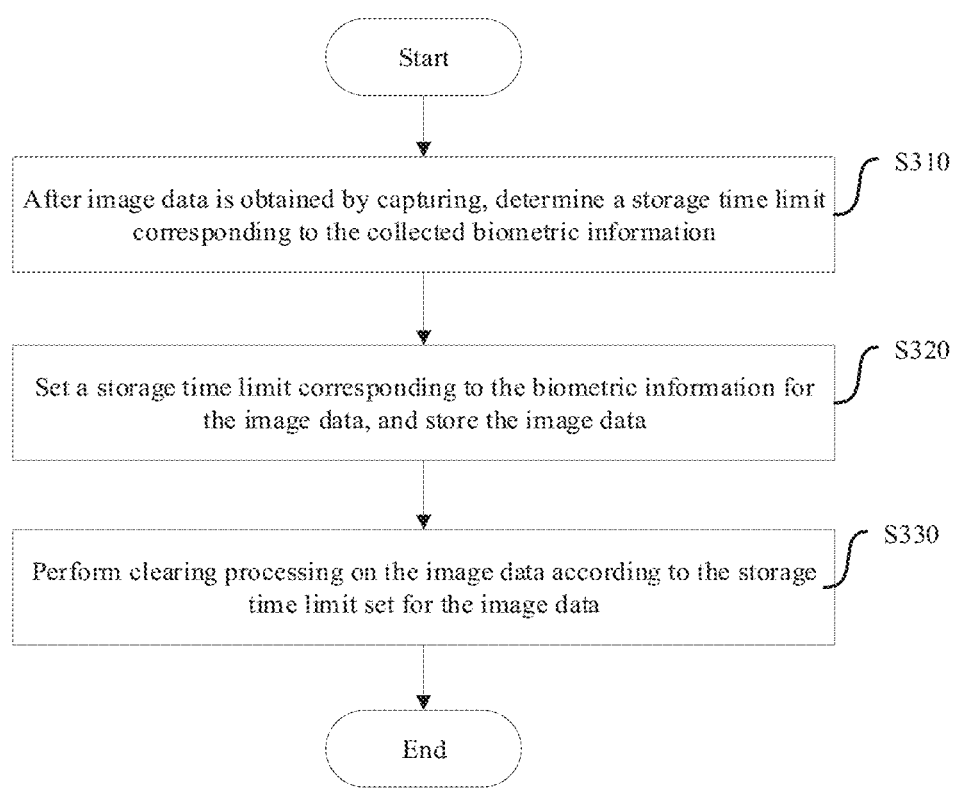
FIG. 3 is a flowchart of steps for performing storage and clearing processing on image data according to embodiment two of the present disclosure.

In this embodiment, the storage control information is storage time limit control information. Based on the storage time limit control information, a storage and clearing strategy based on the storage time limit is provided. FIG. 3 is a flowchart of steps for performing storage and clearing processing on image data according to embodiment two of the present disclosure, including following steps S310-S330.

In a step of S310, after image data is obtained by capturing, a storage time limit corresponding to collected biometric information is determined.

In this embodiment, different biometric information corresponds to a different storage time limit.

The storage time limit may be a storage duration or a storage deadline.

Before an image is captured, fingerprint features of different fingers of a user are collected in advance, and storage time limits are set for fingerprint features of different fingers of the user, so that the fingerprint feature of each finger corresponds to a different storage time limit.

Figure 4:
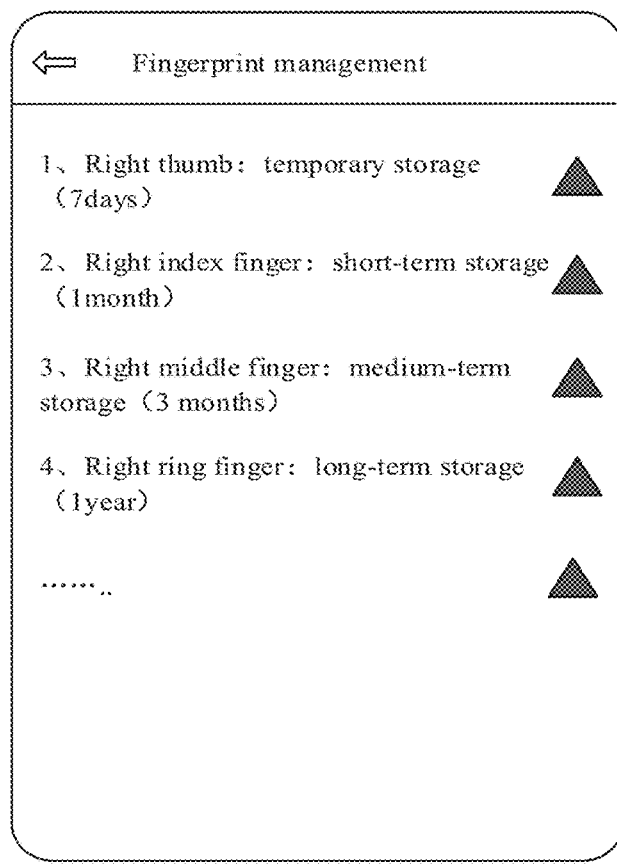
FIG. 4 is a schematic diagram of setting storage time limits for fingerprint features according to embodiment two of the present disclosure.

In an implementation, fingerprint features of multiple fingers of the user are collected, and a corresponding relationship between each of the fingerprint features and a respective one of the storage time limits is set in a fingerprint management page of the mobile terminal. FIG. 4 is a schematic diagram of setting storage time limits for fingerprint features according to embodiment two of the present disclosure. A corresponding storage time limit may be selected for each fingerprint feature, such as, 7 days for temporary storage, 1 month for short-term storage, 3 months for medium-term storage, 1 year for long-term storage, and permanent storage. If the fingerprint feature of a finger used in capturing an image is not collected, the image data will be stored permanently.

After an image is captured, the collected fingerprint feature is matched with the stored fingerprint features. If there is a fingerprint feature matching the collected fingerprint feature in the stored fingerprint features, the storage time limit corresponding to the collected fingerprint feature is determined. If there is no fingerprint feature matching the collected fingerprint feature in the stored fingerprint features, the storage time limit corresponding to the collected fingerprint feature is permanent by default.

If there is a fingerprint feature matching the collected fingerprint feature in the stored fingerprint features, but no corresponding storage time limit is set for the stored fingerprint feature, the storage time limit corresponding to the collected fingerprint feature is permanent by default.

In a step of S320, a storage time limit corresponding to the biometric information is set for the image data, and the image data is stored.

Time attribute is set for the image data and stored. The time attribute includes the capturing time of the image data and the storage time limit of the image data. The storage time limit of the image data may be a storage duration or a storage deadline.

In a step of S330, clearing processing is performed on the image data according to the storage time limit set for the image data.

In response to an expiration of the storage time limit set for the image data, the image data is cleared. Alternatively, a display time corresponding to an image clearing prompt is determined according to the storage time limit set for the image data; the image clearing prompt is displayed in response to an arrival of the display time corresponding to the image clearing prompt, and the image data is cleared after an clearing operation corresponding to the image clearing prompt is triggered.

The image clearing prompt is used to remind the user that the image data will be deleted. The image clearing prompt may trigger a clearing operation and an ignoring operation. Triggering the clearing operation means that the user allows the clearing of the image data. Triggering the ignoring operation means that the user does not allow the clearing of the image data.

In an embodiment, image data in the same time period may be determined according to the storage time limit set for each image data; and the display time of the image clearing prompt may be determined according to storage time limits set for the image data with storage time limits in the same time period. There may be a plurality of image data captured in the same time period, and the display time of the image clearing prompt corresponding to the plurality of image data is determined according to storage time limits set for the plurality of image data.

In an embodiment, the same time period may be the same day, the same week, or the same month. In the storage time limits corresponding to the image data obtained by capturing in the same time period, the earliest coming storage time limit, the latest coming storage time limit, or the average storage time limit may be selected as the display time of the image clearing prompt. Currently, in the same time period, an idle time of the mobile terminal or a time specified by the user may also be selected as the display time of the image clearing prompt.

In this embodiment, the user records and stores fingerprints in advance, and sets storage time (such as temporary, medium-term, long-term, permanent) for the image data obtained after capturing according to a finger (fingerprint feature) used for capturing. The image data obtained by capturing using a finger with no storage time set may be stored permanently. During capturing, the time attribute of the image data obtained by capturing is set according to the storage time corresponding to the fingerprint feature, and the image data is deleted in response to an expiration of the storage time of the image data obtained by capturing.

Embodiment Three

Figure 5:
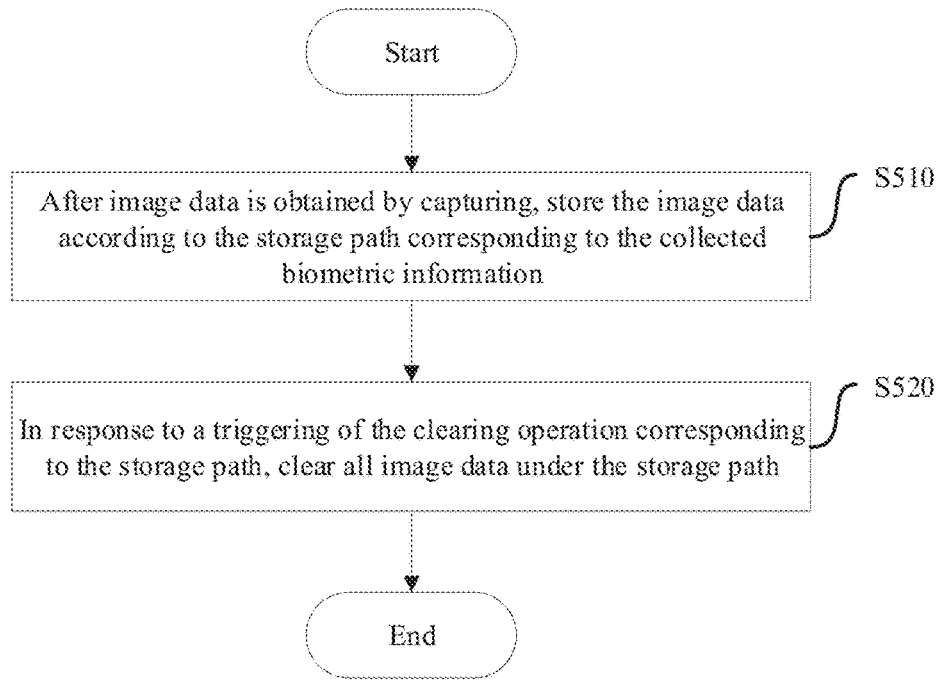
FIG. 5 is a flowchart of steps for performing storage and clearing processing on image data according to embodiment three of the present disclosure.

In this embodiment, the storage control information is storage path control information. Based on the storage path control information, a storage and clearing strategy based on the storage path is provided. FIG. 5 is a flowchart of steps for performing storage and clearing processing on image data according to embodiment three of the present disclosure, including following steps S510 and S520.

In a step of S510, image data is stored according to the storage path corresponding to the collected biometric information after the image data is obtained by capturing.

In this embodiment, different biometric information corresponds to a different storage paths. In this embodiment, user-defined storage paths can be implemented to distinguish the importance of different image data.

Before an image is captured, fingerprint features of different fingers of a user are collected, and different storage paths are set for fingerprint features of different fingers of the user. For fingerprint features with no storage path set, a default storage path may be used.

Figure 6:
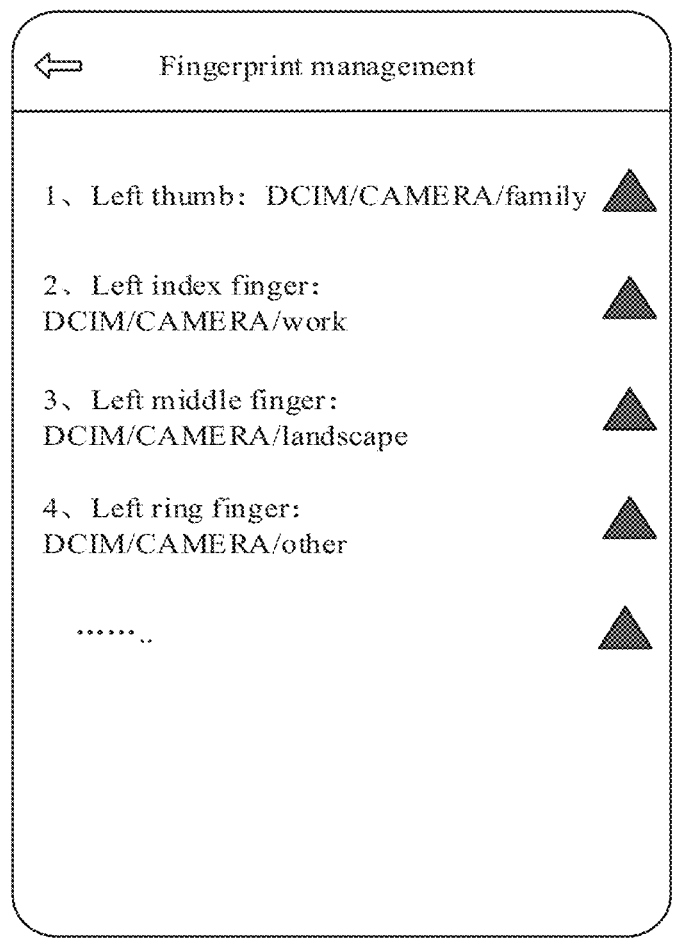
FIG. 6 is a schematic diagram of setting storage paths for fingerprint features according to embodiment three of the present disclosure.

In an implementation, fingerprint features of multiple fingers of the user are collected, and the corresponding relationship between each of the fingerprint features and a respective one of the storage paths is set in the fingerprint management page of the mobile terminal. FIG. 6 is a schematic diagram of setting storage paths for fingerprint features according to embodiment three of the present disclosure. A corresponding storage path may be selected for each fingerprint feature, and a corresponding file name may be set for each storage path, such as home file, work file and landscape file. If the fingerprint feature of a finger used in capturing an image is not collected, or the fingerprint feature of the finger used in capturing an image is collected but the corresponding storage path is not set, the default storage path is used, and the file name is "Other".

After an image is captured, the collected fingerprint feature is matched with stored fingerprint features. If there is a fingerprint feature matching the collected fingerprint feature in the stored fingerprint features, the storage path corresponding to the collected fingerprint feature is determined. If there is no fingerprint feature matching the collected fingerprint feature in the stored fingerprint features, the storage path corresponding to the collected fingerprint feature is the default storage path.

If there is a fingerprint feature matching the collected fingerprint feature in the stored fingerprint features, but no corresponding storage path is set for the stored fingerprint feature, the storage path corresponding to the collected fingerprint feature is the default storage path.

In this embodiment, after image data is obtained by capturing, the image data is stored in the storage path corresponding to the fingerprint feature, so that the image data captured by different fingers may be stored in different categories, which is convenient for users to look up.

In a step of S520, all image data stored under the storage path is cleared in response to a triggering of the clearing operation corresponding to the storage path.

In an embodiment, a clear button may be set in the file corresponding to each storage path, and the clearing processing operation may be triggered by clicking the clear button. During performing the clearing processing operation, all image data stored under the storage path may be cleared. In an implementation, if a user believes that the image data stored in the landscape file can be deleted, he or she may open the landscape file, click the clear button in the landscape file, and trigger the clearing operation to clear all the image data in the landscape file.

In this embodiment, the user can identify the importance of the image data according to the storage paths (file names) of the image data, or look up the image data under different storage paths, so as to clear the useless image data under the storage paths and release the storage space of the mobile terminal.

In this embodiment, the user records and stores fingerprints in advance, and sets a storage path and file name (such as home, landscape, work, etc.) for the image data obtained after capturing according to a finger (fingerprint feature) used for capturing. The image data obtained by capturing using a finger with no storage path and file name set may be stored by the default storage path. During capturing, the image data obtained by capturing is stored according to the storage path corresponding to the fingerprint feature. After the image obtained by capturing is stored for a certain period of time, the image data under the storage path is deleted, or the user deletes the image data under the storage path.

Embodiment Four

Figure 7:
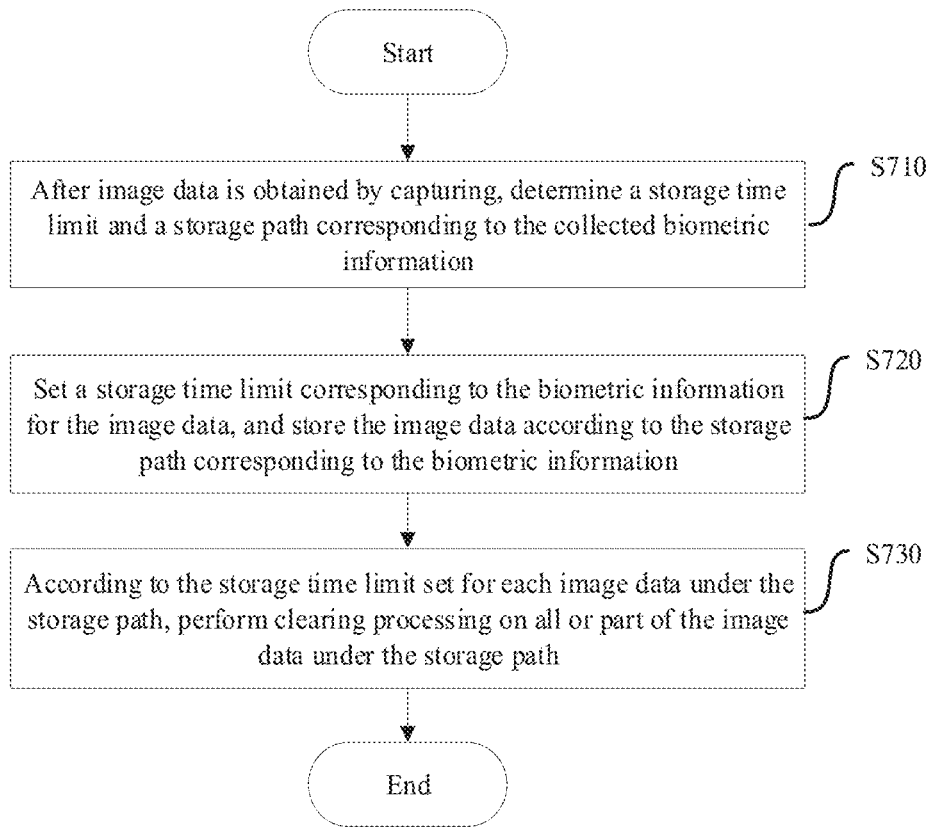
FIG. 7 is a flowchart of steps for performing storage and clearing processing on image data according to embodiment four of the present disclosure.

In this embodiment, the storage information is storage time limit control information and storage path control information. Based on the storage time limit control information and the storage path control information, a storage and clearing strategy based on the storage time limit and a storage and clearing strategy based on the storage path are provided. FIG. 7 is a flowchart of steps for performing storage and clearing processing on image data according to embodiment four of the present disclosure, including following steps S710 to S730.

In a step of S710, a storage time limit and a storage path corresponding to the collected biometric information are determined after image data is obtained by capturing.

In this embodiment, different biometric information may correspond to different storage time limits and/or different storage paths, and different storage paths may correspond to different file names.

In an implementation, the storage time limit may be: temporary storage (7 days), short-term storage (1 month), medium-term storage (3 months) and long-term storage (1 year); and the file name may be landscape file, work file.

Different storage time limits and/or different storage paths are correspondingly set for different biometric information in advance. In an implementation, the fingerprint feature of the right thumb corresponds to the temporarily stored landscape file, and the fingerprint feature of the right index finger corresponds to the short-term stored work file.

In a step of S720, a storage time limit corresponding to the biometric information is set for the image data, and the image data is stored according to the storage path corresponding to the biometric information.

In a step of S730, clearing processing is performed on all or part of the image data under the storage path according to the storage time limit set for each image data under the storage path.

The image data with storage time limits in the same time period may be determined according to the storage time limit set for each image data under the storage path; a display time of an image clearing prompt corresponding to all or part of the image data under the storage path may be determined according to storage time limits of the image data obtained by capturing in the same time period; the image clearing prompt is displayed in response to an arrival of the display time of the image clearing prompt, and all or part of the image data under the storage path is cleared after the image clearing prompt is triggered.

In an embodiment, for each storage path, the image data with storage time limits in the same time period is determined according to the storage time limit set for each image data under the storage path; the display time of the image clearing prompt is determined according to the storage time limits set for the image data with storage time limits in the same time period; the image clearing prompt is displayed in response to an arrival of the display time corresponding to the image clearing prompt, and the image data with storage time limits in the same time period is cleared after an clearing operation corresponding to the image clearing prompt is triggered.

In this embodiment, during capturing photos or videos, the storage time limit and storage path may be quickly set for the image data obtained by capturing, so as to locate which image data need to be cleared and when the image data is to be cleared, instead of clearing after a lot of image data is accumulated, which causes the problem of difficult clearing, and the problem that some image data is difficult to be found during searching for the image data in the later period.

Figure 8:
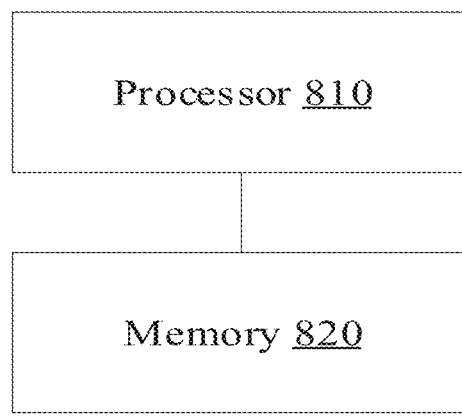
FIG. 8 is a structural diagram of a device for image storage control according to embodiment five of the present disclosure.

According to the present disclosure, a device for image storage control is provided, as shown in FIG. 8, which is a structural diagram of a device for image storage control according to embodiment five of the present disclosure.

In the present disclosure, the structural diagram of a device for image storage control according to embodiment five of the present disclosure includes, but is not limited to, a processor 810 and a memory 820.

The processor 810 is configured to execute an image storage control program stored in the memory 820 to implement the method for image storage control described above.

The processor 810 is configured to execute an image storage control program stored in the memory 820 to implement a method for image storage control including: collecting biometric information of a user during capturing an image; and performing storage and clearing processing on image data obtained by capturing according to storage control information corresponding to the biometric information.

In an embodiment, the storage control information includes storage time limit control information and/or storage path control information.

In an embodiment, in response to the storage control information being the storage time limit control information, performing storage and clearing processing on the image data obtained by capturing according to the storage control information corresponding to the biometric information includes: determining a storage time limit corresponding to the biometric information after the image data is obtained by capturing, where different biometric information corresponds to a different storage time limit; setting a storage time limit corresponding to the biometric information for the image data, and storing the image data; and performing clearing processing on the image data according to the storage time limit set for the image data.

In an embodiment, performing clearing processing on the image data according to the storage time limit set for the image data includes: clearing the image data in response to an expiration of the storage time limit set for the image data; or determining a display time corresponding to an image clearing prompt according to the storage time limit set for the image data; displaying the image clearing prompt in response to an arrival of the display time corresponding to the image clearing prompt, and clearing the image data after an clearing operation corresponding to the image clearing prompt is triggered.

In an embodiment, in response to the storage control information being the storage path control information, performing storage and clearing processing on the image data obtained by capturing according to the storage control information corresponding to the biometric information includes: storing image data according to a storage path corresponding to the biometric information after the image data is obtained by capturing, where different biometric information corresponds to a different storage path; and clearing all image data stored under the storage path in response to a triggering of an clearing operation corresponding to the storage path.

In an embodiment, in response to the storage information being the storage time limit control information and the storage path control information, performing storage and clearing processing on the image data obtained by capturing according to the storage control information corresponding to the biometric information includes: determining a storage time limit and a storage path corresponding to the biometric information after the image data is obtained by capturing, where different biometric information corresponds to a different storage time limit and/or a different storage path; setting a storage time limit corresponding to the biometric information for the image data, and storing the image data according to the storage path corresponding to the biometric information; and performing clearing processing on all or part of the image data under the storage path according to the storage time limit set for each image data under the storage path.

In an embodiment, performing clearing processing on all or part of the image data under the storage path according to the storage time limit set for each image data under the storage path includes: determining image data with storage time limits in a same time period according to the storage time limit set for each image data under the storage path; determining a display time corresponding to an image clearing prompt according to the storage time limit sets for the image data with storage time limits in the same time period; displaying the image clearing prompt in response to an arrival of the display time corresponding to the image clearing prompt, and clearing the image data with storage time limits in the same time period after an clearing operation corresponding to the image clearing prompt is triggered.

In an embodiment, collecting the biometric information of the user includes: invoking an internal or external biometric collector of a mobile terminal to collect the biometric information of the user.

Embodiment Six

According to the present disclosure, a storage medium (computer-readable storage medium) storing one or more programs is provided. The storage medium may include volatile memory, such as random access memory; non-volatile memory, such as read-only memory, flash memory, hard disk, or solid state disk; or a combination thereof.

The one or more programs in the storage medium, when executed by one or more processor, cause to implement the method for image storage control described above.

The processor is configured to execute an image storage control program stored in the memory0 to implement a method for image storage control including: collecting biometric information of a user during capturing an image; and performing storage and clearing processing on image data obtained by capturing according to storage control information corresponding to the biometric information.

In an embodiment, the storage control information includes storage time limit control information and/or storage path control information.

In an embodiment, in response to the storage control information being the storage time limit control information, performing storage and clearing processing on the image data obtained by capturing according to the storage control information corresponding to the biometric information includes: determining a storage time limit corresponding to the biometric information after the image data is obtained by capturing, where different biometric information corresponds to a different storage time limit; setting a storage time limit corresponding to the biometric information for the image data, and storing the image data; and performing clearing processing on the image data according to the storage time limit set for the image data.

In an embodiment, performing clearing processing on the image data according to the storage time limit set for the image data includes: clearing the image data in response to an expiration of the storage time limit set for the image data; or determining a display time corresponding to an image clearing prompt according to the storage time limit set for the image data; displaying the image clearing prompt in response to an arrival of the display time corresponding to the image clearing prompt, and clearing the image data after an clearing operation corresponding to the image clearing prompt is triggered.

In an embodiment, in response to the storage control information being the storage path control information, performing storage and clearing processing on the image data obtained by capturing according to the storage control information corresponding to the biometric information includes: storing image data according to a storage path corresponding to the biometric information after the image data is obtained by capturing, where different biometric information corresponds to a different storage path; and clearing all image data stored under the storage path in response to a triggering of an clearing operation corresponding to the storage path.

In an embodiment, in response to the storage information being the storage time limit control information and the storage path control information, performing storage and clearing processing on the image data obtained by capturing according to the storage control information corresponding to the biometric information includes: determining a storage time limit and a storage path corresponding to the biometric information after the image data is obtained by capturing, where different biometric information corresponds to a different storage time limit and/or a different storage path; setting a storage time limit corresponding to the biometric information for the image data, and storing the image data according to the storage path corresponding to the biometric information; and performing clearing processing on all or part of the image data under the storage path according to the storage time limit set for each image data under the storage path.

In an embodiment, performing clearing processing on all or part of the image data under the storage path according to the storage time limit set for each image data under the storage path includes: determining image data with storage time limits in a same time period according to the storage time limit set for each image data under the storage path; determining a display time corresponding to an image clearing prompt according to the storage time limit sets for the image data with storage time limits in the same time period; displaying the image clearing prompt in response to an arrival of the display time corresponding to the image clearing prompt, and clearing the image data with storage time limits in the same time period after an clearing operation corresponding to the image clearing prompt is triggered.

In an embodiment, collecting the biometric information of the user includes: invoking an internal or external biometric collector of a mobile terminal to collect the biometric information of the user.

It will be understood by those having ordinary skill in the art that all or some of the steps of the methods, functional modules/units in the systems and devices disclosed above may be implemented as software, firmware, hardware, or suitable combinations thereof. In a hardware implementation, the division between functional modules/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on computer-readable medium, which may include computer storage medium (or non-transitory medium) and communication medium (or transitory medium). The term computer storage medium includes volatile and nonvolatile, removable and non-removable medium implemented in any method or technology for storage of information such as computer readable instructions, data structures, program modules or other data, as is well known to those having ordinary skill in the art. Computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can be accessed by a computer. In addition, communication medium typically includes computer readable instructions, data structures, program modules or other data in a modulated data signal such as a carrier wave or other transport mechanism and includes any information delivery medium, as is well known to those having ordinary skill in the art.

An embodiment of the present disclosure has beneficial effects as follows. In the present disclosure, different storage control information is set for different biometric information in advance. The biometric information of the user is collected while capturing an image. Storage and clearing processing is performed on the image data obtained by capturing according to the storage control information corresponding to the collected biometric information, so as to release the storage space of the mobile terminal. Therefore, the mobile terminal can continuously store the image data newly captured by the user even with the increase of capturing time and capturing quantity. Although the embodiments of the present disclosure have been disclosed for illustrative purposes, those having ordinary skill in the art will appreciate that various modifications, additions and substitutions are possible, and that the scope of the present disclosure should not be limited to the embodiments described above.

What is claimed is:

1. A method for image storage control, comprising:
presetting different storage control information for different biometric information of a same user respectively, wherein the storage control information comprises one of: storage time limit control information corresponding to the biometric information; and storage time limit control information and storage path control information corresponding to the biometric information;
collecting biometric information of the user during capturing image data, wherein the image data comprises photo data or video data; and
performing storage and clearing processing on the image data according to the storage control information corresponding to the biometric information;
wherein, in response to the storage control information being the storage time limit control information corresponding to the biometric information, performing storage and clearing processing on the image data according to the storage control information corresponding to the biometric information comprises:
determining the storage time limit control information corresponding to the biometric information after the image data is obtained;
setting a storage time limit of the image data according to the determined storage time limit control information, and storing the image data; and
performing clearing processing on the image data according to the set storage time limit of the image data;
wherein, in response to the storage control information being the storage time limit control information and the storage path control information corresponding to the biometric information, performing storage and clearing processing on the image data according to the storage control information corresponding to the biometric information comprises:
determining the storage time limit control information and the storage path control information corresponding to the biometric information after the image data is obtained;
setting a storage time limit of the image data according to the determined storage time limit control information and a storage path according to the determined storage path control information, and storing the image data according to the set storage time limit and the set storage path; and
performing clearing processing on all or part of the image data under the storage path according to the set storage time limit of each image data under the storage path.

2. The method of claim 1, wherein performing clearing processing on the image data according to the set storage time limit of the image data comprises one of:
clearing the image data in response to an expiration of the set storage time limit set of the image data; and
determining a display time corresponding to an image clearing prompt according to the set storage time limit of the image data; displaying the image clearing prompt in response to an arrival of the display time corresponding to the image clearing prompt, and clearing the image data after a clearing operation corresponding to the image clearing prompt is triggered.

3. The method of claim 1, wherein, performing clearing processing on all or part of the image data under the storage path according to the set storage time limit of each image data under the storage path comprises:
determining image data with storage time limits in a same time period according to the set storage time limit of each image data under the storage path;
determining a display time corresponding to an image clearing prompt according to the set storage time limits of the image data with storage time limits in the same time period;
displaying the image clearing prompt in response to an arrival of the display time corresponding to the image clearing prompt, and clearing the image data with storage time limits in the same time period after a clearing operation corresponding to the image clearing prompt is triggered.

4. The method of claim 1, wherein collecting the biometric information of the user comprises:
invoking an internal or external biometric collector of a mobile terminal to collect the biometric information of the user.

5. A device for image storage control, comprising a processor and a memory; wherein the memory stores an image storage control program which, when executed by the processor, causes the processor to perform a method for image storage control comprising:
presetting different storage control information for different biometric information of a same user respectively, wherein the storage control information comprises one of: storage time limit control information corresponding to the biometric information; and storage time limit control information and storage path control information corresponding to the biometric information;

collecting biometric information of the user during capturing image data, wherein the image data comprises photo data or video data; and performing storage and clearing processing on the image data according to the storage control information corresponding to the biometric information;

wherein, in response to the storage control information being the storage time limit control information corresponding to the biometric information, performing storage and clearing processing on the image data according to the storage control information corresponding to the biometric information comprises:

determining the storage time limit control information corresponding to the biometric information after the image data is obtained;

setting a storage time limit of the image data according to the determined storage time limit control information, and storing the image data; and performing clearing processing on the image data according to the set storage time limit of the image data;

wherein, in response to the storage control information being the storage time limit control information and the storage path control information corresponding to the biometric information, performing storage and clearing processing on the image data according to the storage control information corresponding to the biometric information comprises:

determining the storage time limit control information and the storage path control information corresponding to the biometric information after the image data is obtained;

setting a storage time limit of the image data according to the determined storage time limit control information and a storage path according to the determined storage path control information, and storing the image data according to the set storage time limit and the set storage path; and performing clearing processing on all or part of the image data under the storage path according to the set storage time limit of each image data under the storage path.

6. The device of claim 5, wherein collecting the biometric information of the user comprises:

invoking an internal or external biometric collector of a mobile terminal to collect the biometric information of the user.

7. A non-transitory computer-readable storage medium storing one or more programs which, when executed by one or more processors, cause the one or more processors to perform the method for image storage control comprising:

presetting different storage control information for different biometric information of a same user respectively, wherein the storage control information comprises one of: storage time limit control information corresponding to the biometric information; and storage time limit control information and storage path control information corresponding to the biometric information;

collecting biometric information of the user during capturing image data, wherein the image data comprises photo data or video data; and performing storage and clearing processing on the image data according to the storage control information corresponding to the biometric information;

wherein, in response to the storage control information being the storage time limit control information corresponding to the biometric information, performing storage and clearing processing on the image data according to the storage control information corresponding to the biometric information comprises:

determining the storage time limit control information corresponding to the biometric information after the image data is obtained;

setting a storage time limit of the image data according to the determined storage time limit control information, and storing the image data; and performing clearing processing on the image data according to the set storage time limit of the image data;

wherein, in response to the storage control information being the storage time limit control information and the storage path control information corresponding to the biometric information, performing storage and clearing processing on the image data according to the storage control information corresponding to the biometric information comprises:

determining the storage time limit control information and the storage path control information corresponding to the biometric information after the image data is obtained;

setting a storage time limit of the image data according to the determined storage time limit control information and a storage path according to the determined storage path control information, and storing the image data according to the set storage time limit and the set storage path; and performing clearing processing on all or part of the image data under the storage path according to the set storage time limit of each image data under the storage path.

8. The non-transitory computer-readable storage medium of claim 7, wherein collecting the biometric information of the user comprises:

invoking an internal or external biometric collector of a mobile terminal to collect the biometric information of the user.

9. The method of claim 1, wherein the different biometric information of the same user comprises different fingerprint features corresponding to different fingers of the same user.

\* \* \* \* \*